(12) United States Patent
Nogueira-Nine

(10) Patent No.: US 10,656,299 B2
(45) Date of Patent: May 19, 2020

(54) METHOD FOR OPERATING A SENSOR DEVICE, AND SENSOR DEVICE

(71) Applicant: Robert Bosch GmbH, Stuttgart (DE)

(72) Inventor: Juan Nogueira-Nine, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 15/544,453

(22) PCT Filed: Jan. 27, 2016

(86) PCT No.: PCT/EP2016/051633
§ 371 (c)(1),
(2) Date: Jul. 18, 2017

(87) PCT Pub. No.: WO2016/131619
PCT Pub. Date: Aug. 25, 2016

(65) Prior Publication Data
US 2017/0371060 A1    Dec. 28, 2017

(30) Foreign Application Priority Data
Feb. 17, 2015 (DE) .................. 10 2015 202 782

(51) Int. Cl.
*G01V 3/00* (2006.01)
*G01V 3/08* (2006.01)
(Continued)

(52) U.S. Cl.
CPC ............. *G01V 3/081* (2013.01); *G01S 13/04* (2013.01); *G01S 15/04* (2013.01); *G01S 17/04* (2020.01);
(Continued)

(58) Field of Classification Search
CPC .................................................. G01V 3/081
(Continued)

(56) References Cited

U.S. PATENT DOCUMENTS

2006/0136131 A1* 6/2006 Dugan ............... G01V 3/081
701/300
2012/0147531 A1* 6/2012 Rabii ................. H05K 7/00
361/679.01
(Continued)

FOREIGN PATENT DOCUMENTS

DE    102013010235 A1    12/2014
EP     2 207 151       *  7/2010
(Continued)

OTHER PUBLICATIONS

International Search Report dated Apr. 4, 2016, of the corresponding International Application PCT/EP2016/051633 filed Jan. 27, 2016.

*Primary Examiner* — Hien D Khuu
(74) *Attorney, Agent, or Firm* — Norton Rose Fulbright US LLP; Gerard Messina

(57) ABSTRACT

A method for operating a sensor device for detecting an object, having a first surroundings sensor and a second surroundings sensor for detecting a surroundings of the sensor device, including detecting a surroundings of the sensor device using the first surroundings sensor to ascertain first surroundings data, the second surroundings sensor being deactivated; ascertaining whether the first surroundings data are sufficient to be able to conclude with a predetermined probability whether an object is located in the surroundings; if the first surroundings data are sufficient, ascertaining whether an object is located in the surroundings, based on the first surroundings data; if the first surroundings data are not sufficient, activating the deactivated second surroundings sensor; detecting the surroundings of the sensor device using the second surroundings sensor to ascertain second surroundings data; ascertaining whether an object is located in the surroundings, based on the second surroundings data.

14 Claims, 2 Drawing Sheets

(51) Int. Cl.
   *G08G 1/14*     (2006.01)
   *G08G 1/042*    (2006.01)
   *G01S 17/04*    (2020.01)
   *G01S 13/04*    (2006.01)
   *G01S 15/04*    (2006.01)
   *G01V 3/38*     (2006.01)
   *G01S 13/931*   (2020.01)

(52) U.S. Cl.
   CPC .............. *G01V 3/38* (2013.01); *G08G 1/042* (2013.01); *G08G 1/146* (2013.01); *G08G 1/147* (2013.01); *G01S 13/931* (2013.01)

(58) Field of Classification Search
   USPC ........................................................ 702/150
   See application file for complete search history.

(56) References Cited

U.S. PATENT DOCUMENTS

2013/0027218 A1*  1/2013  Schwarz ................ G01D 4/002
                                                340/870.02
2014/0009174 A1*  1/2014  Youssi ................. G01N 27/223
                                                324/665
2015/0262436 A1*  9/2015  Herthan .............. B60R 25/2054
                                                340/5.72

FOREIGN PATENT DOCUMENTS

JP    2013127717 A    6/2013
WO    2010069002 A1   6/2010

* cited by examiner

METHOD FOR OPERATING A SENSOR DEVICE, AND SENSOR DEVICE

FIELD

The present invention relates to a method for operating a sensor device for detecting an object. The present invention also relates to a sensor device for detecting an object. The present invention further relates to a computer program.

BACKGROUND INFORMATION

The determination of the capacity of parking garages and parking facilities is of great importance in terms of their operation and in terms of traffic regulation in cities. For this reason, sensors are used for monitoring parking facilities, which transmit the state of the parking facility to a control station. The detection of the state usually takes place either via magnetic field sensors, cameras or by emitting sensors, such as ultrasonic sensors or radar sensors.

Depending on the system, the sensors are either permanently connected to a power grid or to a data network, which means high installation outlay. Or they are battery-powered and communicate wirelessly via radio with the control station. The challenge of wireless systems is, in particular, to maximize the service life, which is limited by the battery capacity.

SUMMARY

An object of the present invention is to enable an electrical power consumption of a sensor device to be reduced.

This object is achieved with the aid of the present invention. Advantageous embodiments of the present invention are described herein.

According to one aspect, a method is provided for operating a sensor device for detecting an object, which includes a first surroundings sensor and a second surroundings sensor for detecting a surroundings of the sensor device, including the following steps:

detecting a surroundings of the sensor device with the aid of the first surroundings sensor, in order to ascertain first surroundings data based on the detected surroundings, the second surroundings sensor being deactivated, ascertaining whether the first surroundings data are sufficient, in order to be able to conclude with a predetermined probability whether an object is located in the surroundings, if the first surroundings data are sufficient, ascertaining whether an object is located in the surroundings, based on the first surroundings data, if the first surroundings data are not sufficient, activating the deactivated second surroundings sensor, detecting the surroundings of the sensor device with the aid of the second surroundings sensor, in order to ascertain second surroundings data based on the detected surroundings, ascertaining whether an object is located in the surroundings based on the second surroundings data.

According to another aspect, a sensor device is provided for detecting an object, including:

a first surroundings sensor and a second surroundings sensor for detecting a surroundings of the sensor device, a control unit for controlling the surroundings sensors, which is designed to control the first surroundings sensor in such a way that a surroundings of the sensor device is detected with the aid of the first surroundings sensor, the second surroundings sensor being deactivated, and a processor, which is designed to ascertain first surroundings data based on the detected surroundings, the processor further being designed to ascertain whether the first surroundings data are sufficient, in order to be able to conclude with a predefined probability whether an object is located in the surroundings the processor further being designed, if the first surroundings data are sufficient, to ascertain based on the first surroundings data whether an object is located in the surroundings, the control unit being designed, if the first surroundings data are not sufficient, to activate the deactivated second surroundings sensor and to control the activated second surroundings sensor in such a way that a surroundings of the sensor device is detected with the aid of the second surroundings sensor, the processor further being designed to ascertain second surroundings data based on the surroundings detected with the aid of the second surroundings sensor and to ascertain based on the second surroundings data whether an object is located in the surroundings.

According to yet another aspect, a computer program is provided, which includes program code for carrying out the method according to the present invention when the computer program is executed on a computer.

Thus, the present invention includes, in particular, and among other things, activating the second surroundings sensor of a sensor device only if the measurement of the first surroundings sensor is not sufficient, in order to be able to say with a predetermined probability whether or not an object is located in the surroundings of the sensor device. Thus, because the second surroundings sensor is not continuously, i.e., permanently activated, in order to detect the surroundings of the sensor device, an electrical power consumption of the sensor device may be advantageously reduced. This, as compared to a sensor device having two surroundings sensors, both surroundings sensors carrying out a surroundings detection permanently or at predefined intervals.

An insufficient measurement of the first surroundings sensor may occur, for example, in the following situation: If a magnetic field sensor is used as a first surroundings sensor, in order to detect a vehicle, and if the magnetic field sensor is situated close to a subway station or a train station, it may happen that a passing train or a passing subway influences and changes the magnetic field in the surroundings of the magnetic field sensor. As a result, a quality of a magnetic field measurement may be impaired. Thus, an unclear situation may result, in which the measurement of the first surroundings sensor is not sufficient. The second surroundings sensor is then activated.

In addition, a service life limited by a battery capacity may be advantageously maximized if the sensor device includes such a battery for the electrical power supply. Thus, the sensor device may therefore also be advantageously used in environs that have no wired power mains for the purpose of supplying power. It is thus possible to reduce an outlay in the installation of the sensor device.

According to one specific embodiment, it is provided that the first surroundings sensor and/or the second surroundings sensor is/are one of the following surroundings sensors: ultrasonic sensor, radar sensor, LIDAR sensor, laser sensor, infrared sensor, video sensor, magnetic field sensor, vibration sensor and microphone.

According to one specific embodiment, it is provided that the first surroundings sensor and/or the second surroundings sensor is/are deactivated after the corresponding detection of the surroundings. This yields, in particular, the technical advantage that a power consumption of the sensor device may be still further reduced, because an electrical power consumption of the corresponding surroundings sensor is advantageously further reduced as a result of the deactivation of the first surroundings sensor and/or of the second surroundings sensor.

This means, in particular, therefore that the first surroundings sensor is deactivated after the detection of the surroundings with the aid of the first surroundings sensor.

This means, in particular, therefore that the second surroundings sensor is deactivated after the detection of the surroundings with the aid of the second surroundings sensor.

A deactivation within the context of the present invention includes, in particular, operating the surroundings sensor in a standby mode or backup mode. A deactivation within the context of the present invention includes, in particular, interrupting a current supply or an electrical power supply in general for the surroundings sensor (i.e., for the first surroundings sensor and/or the second surroundings sensor). This means, in particular, therefore that a deactivation may include completely disconnecting the corresponding surroundings sensor from an electrical power supply.

An activation within the context of the present invention includes, in particular, the first surroundings sensor and/or second surroundings sensor being awakened from a sleep state or stand-by state or backup state. An activation includes, in particular, the first surroundings sensor and/or second surroundings sensor being reconnected to an electrical power supply if it was previously disconnected from the power supply.

The wording "respectively" within the context of the present invention includes, in particular, the wording "and/or".

According to one specific embodiment, it is provided that an instantaneous result of the ascertainment of whether an object is located in the surroundings is compared with an earlier result of a chronologically earlier ascertainment of whether an object is located in the surroundings, the instantaneous result being transmitted over a communication network only if there is a difference between the instantaneous result and the earlier result.

This yields, in particular, the technical advantage that an electrical power consumption of the sensor device may be still further reduced, because only the instantaneous result is transmitted over the communication network if a difference between the instantaneous result and the earlier result has been determined. This advantageously ensures, in particular, that an existing data bandwidth may be efficiently utilized.

A result within the context of the present invention includes, in particular, the detection of an object, i.e., the presence of an object in the surroundings, i.e., the object being located in the surroundings. A result includes, in particular, the non-detection of an object, i.e., no object being located in the surroundings.

The earlier result was ascertained analogously to the instantaneous result by the method according to the present invention and/or by the sensor device according to the present invention. This means, therefore, that the surroundings of the sensor device were detected at a chronologically earlier point in time, in order to ascertain whether or not an object is located in the surroundings.

In another specific embodiment, it is provided that the activation and the deactivation of the second surroundings sensor is carried out with the aid of a switch, which is connected between the second surroundings sensor and an electrical power supply. This yields, in particular, the technical advantage that an efficient activation and deactivation is possible. A complete disconnection of the surroundings sensor from the electrical power supply is, in particular, advantageously possible with the aid of the switch. The switch is preferably controlled, i.e., in particular, opened and closed, with the aid of the control unit.

According to one specific embodiment, the switch is an electronic switch. For example, the switch is a transistor, in particular, a field effect transistor.

According to one specific embodiment, the switch is a mechanical switch.

The activation with the aid of the switch includes, in particular, the switch being closed and/or the electronic switch being controlled (i.e., for example, with the aid of the control unit) so that it becomes electrically conductive. The deactivation with the aid of the switch includes, in particular, the switch being opened and/or an electronic switch being controlled in such a way that it becomes non-conductive.

In another specific embodiment, it is provided that the activation and the deactivation of the first surroundings sensor is carried out with the aid of a switch, which is connected between the first surroundings sensor and an electrical power supply. The corresponding explanations made in conjunction with the second surroundings sensor with respect to the switch apply analogously also to a switch, which is connected between the electrical power supply and the first surroundings sensor. This switch may be referred to, for example, as the first switch. The switch, which is connected between the second surroundings sensor and the electrical power supply, may be referred to, for example, as the second switch. The first switch may, for example, also be controlled with the aid of the control unit, analogously to the second switch.

In another specific embodiment, it is provided that the first surroundings sensor is a magnetic field sensor and the second surroundings sensor is a radar sensor, or the first surroundings sensor is a magnetic field sensor and the second surroundings sensor is an ultrasonic sensor, or the first surroundings sensor is a magnetic field sensor and the second surroundings sensor is an infrared sensor.

Providing the magnetic field sensor as the first surroundings sensor yields, in particular, the technical advantage that a simple and energy-saving detection of the surroundings of the sensor device may be effectuated. A detection with the aid of a magnetic field sensor is generally sufficient in order to detect an object in the surroundings. Thus, with the aid of the magnetic field sensor it may already be generally reliably determined whether or not an object is located in the surroundings.

The use of a sensor as the second surroundings sensor, which emits and/or is able to detect ultrasound or an electromagnetic radiation (radar sensor, infrared sensor), yields, in particular, the technical advantage that it may be particularly reliably determined, based on the corresponding surroundings measurement with the aid of the second surroundings sensor, whether or not an object is located in the surroundings. The use of the radar sensor, in particular, has the advantage that a reliable object detection is reliably possible under different environmental conditions. For example, a radar sensor may still reliably detect the surroundings if, for example, an infrared sensor or an ultrasonic sensor is no longer able to reliably do so. For example, a detection sensitivity of an infrared sensor and/or ultrasonic sensor decreases if, for example, snow or dirt has accumulated on the surroundings sensor.

In another specific embodiment, it is provided that the first surroundings sensor is a magnetic field sensor and the second surroundings sensor is a radar sensor, the processor being designed to process the raw radar sensor data in the time range (time domain), in order to ascertain the second surroundings data based on the processing. This yields, in particular, the technical advantage that a rapid and efficient signal processing is enabled, because a processing in the time range involves less effort and is more rapidly possible than a processing in the frequency range (frequency domain), as is otherwise usual in conjunction with radar sensors. Thus, according to the present invention, a movement away from the technical norm is provided here. Raw data of a radar sensor may be processed with less effort in the time range, in particular, since they come directly from the radar sensor and they correspond to a digital scanning of the analog measuring signal of the radar sensor. This simplifies a processing. A processing in the frequency range includes, in particular, a Fourier transformation of the raw data, which involves more effort. The processing in the time range is sufficient in order to be able to conclude whether or not an object is located in the surroundings. Exact specifications of distance to the object are generally not necessary.

In another specific embodiment, it is provided that the object is a vehicle parked in a parking position or a vehicle driving on a street or a container stored in a container storage yard. This means, in particular, therefore that the sensor device may be used in order to determine or detect an occupied state of a parking position. If, therefore, a vehicle is detected in the parking position, this means that the parking position is occupied. If no vehicle is detected, this means that the parking position is vacant, i.e., is unoccupied. A result of a surroundings detection in this case is, in particular, that the parking position is occupied or vacant, i.e., unoccupied.

The sensor device may then be referred to, in particular, as a sensor device for detecting an occupied state of a parking position.

Thus, if the object is a vehicle driving on a street, a traffic flow and/or traffic volume may be detected and/or monitored with the aid of the sensor device. Such a sensor device may then be referred to, in particular, as a sensor device for monitoring and/or for measuring a traffic volume and/or traffic rate.

This therefore also means, in particular, that for example the sensor device may detect an occupied state of a container storage space if the object is a container.

According to one specific embodiment, it is provided that the control unit is designed to deactivate the first surroundings sensor and/or the second surroundings sensor after the corresponding detection of the surroundings.

According to still another specific embodiment, it is provided that the processor is designed to compare an instantaneous result of the ascertainment of whether or not an object is located in the surroundings with an earlier result of a chronologically earlier ascertainment of whether or not an object is located in the surroundings, a communication interface being provided, which is designed to transmit the instantaneous result over a communication network if there is a difference between the instantaneous result and the earlier result.

According to one specific embodiment, it is provided that an electrical power supply and a switch are provided, the switch being connected between the second surroundings sensor and the electrical power supply, so that the activation and the deactivation of the second surroundings sensors may be carried out with the aid of the switch. The activation then includes, in particular, a closing of the switch and/or a controlling of the electronic switch, so that the switch is open or electrically conductive. A deactivation includes, in particular, an opening of the switch and/or a controlling of the electronic switch, so that the switch becomes electrically non-conductive, i.e., isolating.

In one specific embodiment, it is provided that an electrical power supply and a switch are provided, the switch being connected between the first surroundings sensor and the electrical power supply, so that the activation and the deactivation of the first surroundings sensor may be carried out with the aid of the switch.

Similar to the explanations given above, such a switch may also be referred to as the first switch. The switch, which is connected between the second surroundings sensor and the electrical power supply, may be referred to, in particular, as the second switch.

Device features result analogously from corresponding method features and vice versa. This means, in particular, therefore that features, technical advantages and explanations relating to the sensor device result analogously from corresponding explanations, features and advantages of the method and vice versa. This means, in particular, therefore that technical functionalities of the method result from the device and vice versa.

According to one specific embodiment, it is provided that the sensor device is configured or designed to execute or carry out the method according to the present invention.

According to one specific embodiment, it is provided that the method according to the present invention operates the sensor device according to the present invention.

According to one specific embodiment, an electrical power supply includes one battery or multiple batteries and/or one or multiple rechargeable batteries.

According to one specific embodiment, a communication interface is provided, which is designed to transmit a result of the ascertainment of whether or not an object is located in the surroundings over a communication network. The sensor device includes the communication interface, for example.

According to one specific embodiment, the communication network includes a WLAN network and/or a mobile communication network.

According to one specific embodiment, a communication over the communication network is encrypted and/or becomes encrypted.

According to one specific embodiment, the processor and the control unit are included in a microcontroller.

According to one specific embodiment, the processor and/or the control unit and/or the communication interface and/or the microcontroller are switched into a sleep mode or idle state or a standby state.

The present invention is explained in greater detail below with reference to preferred exemplary embodiments.

DETAILED DESCRIPTION OF EXAMPLE EMBODIMENTS

Figure 1:
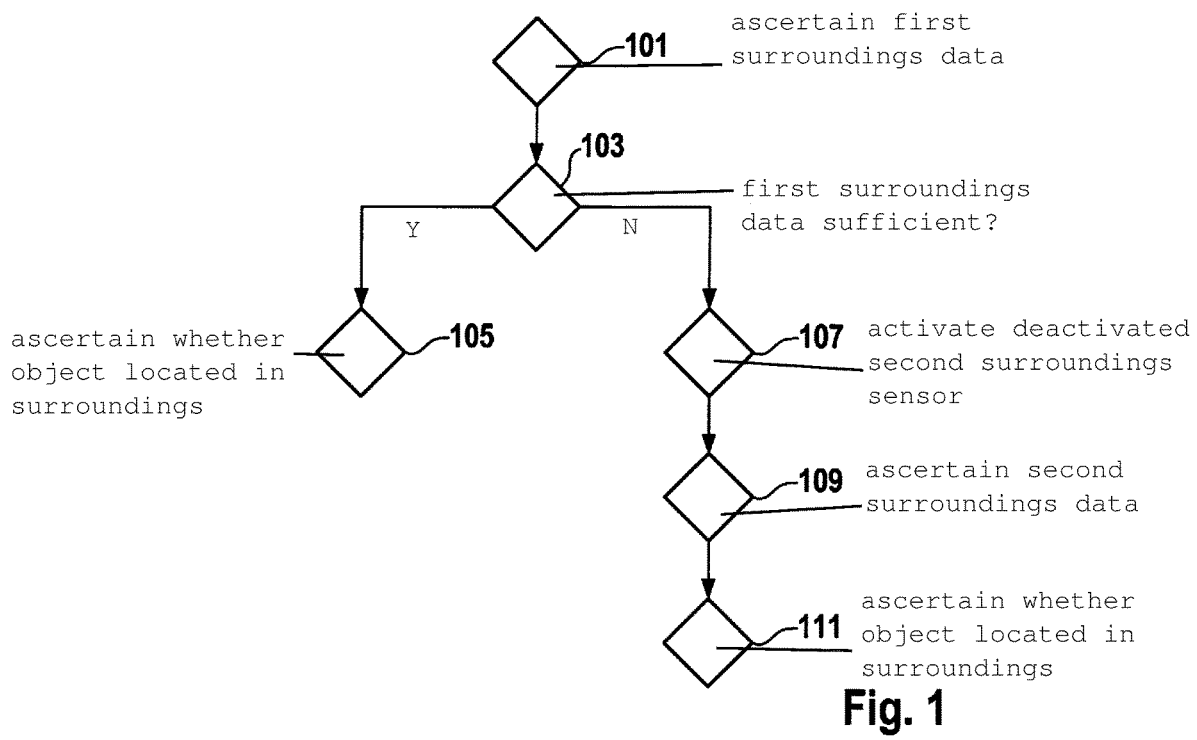
FIG. 1 shows a flow chart of a method for operating a sensor device.

FIG. 1 shows a flow chart of a method for operating a sensor device for detecting an object, which includes a first surroundings sensor and a second surroundings sensor for detecting a surroundings of the sensor device.

The method includes the following steps:
detecting 101 a surroundings of the sensor device with the aid of the first surroundings sensor, in order to ascertain first surroundings data based on the detected surroundings, the second surroundings sensor being deactivated,
ascertaining 103 whether the first surroundings data are sufficient in order to be able to conclude with a predetermined probability whether an object is located in the surroundings,
if the first surroundings data are sufficient, ascertaining 105 whether an object is located in the surroundings, based on the first surroundings data,
if the first surroundings data are not sufficient, activating 107 the deactivated second surroundings sensor,
detecting 109 the surroundings of the sensor device with the aid of the second surroundings sensor, in order to ascertain second surroundings data based on the detected surroundings,
ascertaining 111 whether an object is located in the surroundings based on the second surroundings data.

In one specific embodiment not shown, it is provided that the first surroundings sensor is deactivated after the detection of the surroundings with the aid of the first surroundings sensor.

In one specific embodiment not shown, it is provided that the second surroundings sensor is deactivated after the detection of the surroundings with the aid of the second surroundings sensor.

Figure 2:
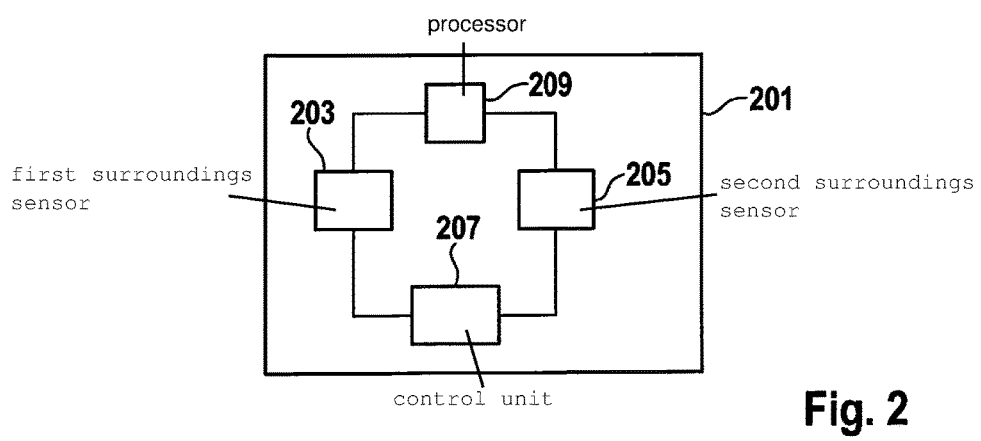
FIG. 2 shows a sensor device.

FIG. 2 shows a sensor device 201 for detecting an object. Sensor device 201 includes:
a first surroundings sensor 203 and a second surroundings sensor 205 for detecting a surroundings of sensor device 201,
a control unit 207 for controlling surroundings sensors 203, 205, which is designed to control first surroundings sensor 203 in such a way that a surroundings of sensor device 201 is detected with the aid of first surroundings sensor 203, second surroundings sensor 205 being deactivated, and
a processor 209, which is designed to ascertain first surroundings data based on the detected surroundings,
processor 209 further being designed to ascertain whether the first surroundings data are sufficient, in order to be able to conclude with a predetermined probability whether an object is located in the surroundings,
processor 209 further being designed, if the first surroundings data are sufficient, to ascertain based on the first surroundings data whether an object is located in the surroundings,
control unit 207 being designed, if the first surroundings data are not sufficient, to activate deactivated second surroundings sensor 205 and to control activated second surroundings sensor 205 in such a way that a surroundings of sensor device 201 is detected with the aid of second surroundings sensor 205,
processor 209 further being designed to ascertain second surroundings data based on the surroundings detected with the aid of second surroundings sensor 205 and to ascertain based on the second surroundings data whether an object is located in the surroundings.

Figure 3:
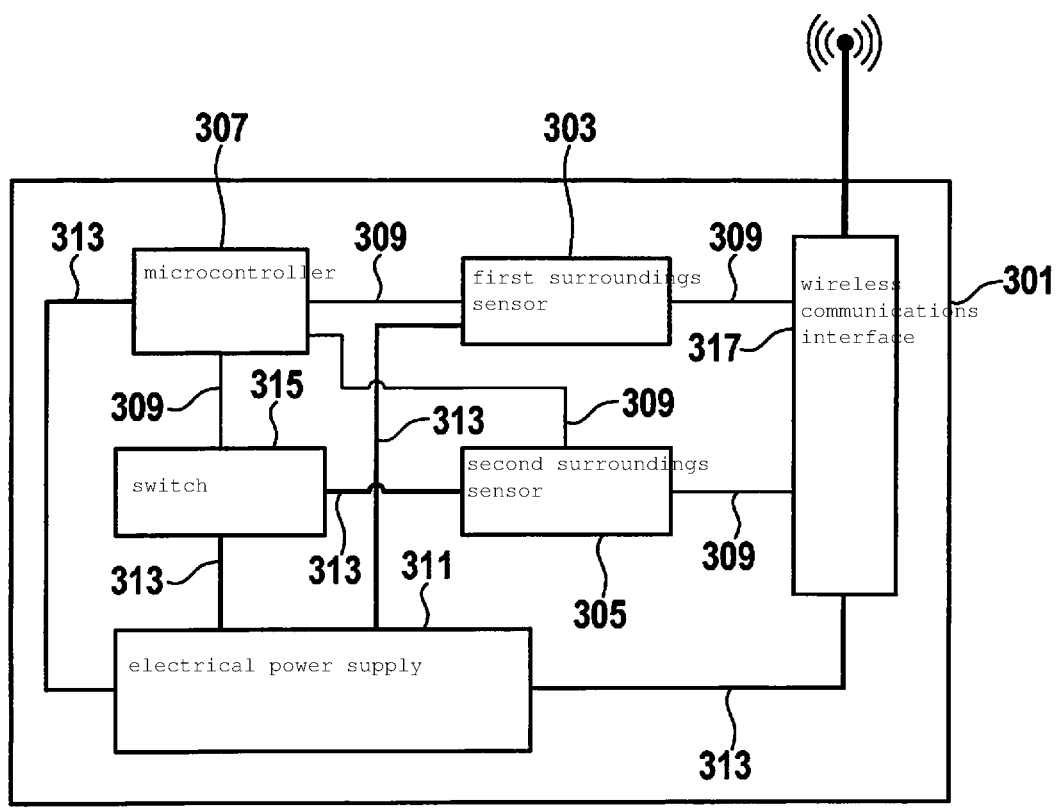
FIG. 3 shows another sensor device.

FIG. 3 shows another sensor device 301.

Sensor device 301 includes a first surroundings sensor 303 and a second surroundings sensor 305. Sensor device 301 further includes a microcontroller 307, which includes a processor not shown and a control unit not shown for controlling surroundings sensors 303, 305. Microcontroller 307 is connected to the two surroundings sensors 303, 305 with the aid of data lines and control lines 309.

Sensor device 301 further includes an electrical power supply 311, which is connected via a power line 313 to microcontroller 307. This means, therefore, that electrical power supply 311 may supply microcontroller 307 with electrical power with the aid of power line 313. Furthermore, electrical power supply 311 also supplies first surroundings sensor 303 with electrical power with the aid of a power line 313. In this case, first surroundings sensor 303 is directly connected to electrical power supply 311 with the aid of power line 313. This means, therefore, that no switch is connected between first surroundings sensor 303 and electrical power supply 311.

Electrical power supply 311 includes, for example, one battery or multiple batteries.

Electrical power supply 311 includes, for example, a power circuit not shown here in detail.

Second surroundings sensor 305 is also supplied with electrical power with the aid of electrical power supply 311. In this case, however, a switch 315 is connected between electrical power supply 311 and second surroundings sensor 305. This means, therefore, that a power line 313 leads from electrical power supply 311 to switch 315. From there, an additional power line 313 leads to second surroundings sensor 305. This means, in particular, therefore that the second surroundings sensor may be disconnected completely from electrical power supply 311 with the aid of switch 315. With the possibility of a complete disconnection of the electrical power supply, an electrical power consumption of second surroundings sensor 305 may be reduced. Switch 315 is controlled, i.e., in particular, opened or closed, with the aid of microcontroller 307.

Sensor device 301 further includes a communication interface 317, which is designed as a wireless communication interface. A power line 313 connects communication interface 317 to electrical power supply 311. Data lines and control lines 309 lead from the two surroundings sensors 303, 305 to wireless communication interface 317. A transfer of sensor data and/or results, which have been ascertained on the basis of the sensor data, i.e., on the surroundings data in general, is possible and provided with the aid of wireless communication interface 317, for example, the data and/or the results are transmitted over a communication network.

The following specific embodiment of a method according to the present invention may be carried out, for example, with the aid of sensor device 301.

An algorithm running on microcontroller 307 activates first surroundings sensor 303 at regular points in time and carries out, for example, various measurements of the corresponding physical parameters. The measured values and the specific parameters for the measuring method such as, for example, a signal-to-noise ratio (SNR), filter parameters, number of examples per measurement carried out, average mode and length, quantization errors, bandwidth, scanning frequency, etc. are transmitted to microcontroller 307 and used as an input variable for the aforementioned algorithm. Based on the information contained in the received data, the algorithm decides whether such a piece of information is clear enough in order to make a reliable decision about the occupied status (in general, an occupancy status) of a parking space (in general, a parking position).

In the event the measured result of first surroundings sensor 303 was sufficiently clear and the occupied status of the parking space has changed, the status change is communicated via wireless communication interface 317 to a remote processor or server (not shown) and first surroundings sensor 303 and microcontroller 307 re-enter the sleep mode. Otherwise, if the measured result was sufficiently clear, but the occupied status of the parking space has not changed since the last data transmission with the aid of communication interface 317, then both first surroundings sensor 303 as well as microcontroller 307 immediately re-enter the sleep mode.

To avoid unnecessary power consumption, second surroundings sensor 305, when not in use, is switched off in the case of a very low leakage current by switch 315, which in general may be designed, for example, as a mains switch. Switch 315 is digitally controlled by microcontroller 307 and, therefore, according to one specific embodiment in particular, by a scanning algorithm.

If the measured result of first surroundings sensor 303 was not sufficiently clear for surroundings sensor 303, in order to make a clear and reliable decision about the occupied status of the parking space, the algorithm activates second surroundings sensor 305 according to the following exemplary steps:
1. Switching on second surroundings sensor 305 by activating or triggering switch 315.
2. Carrying out a measurement with the aid of second surroundings sensor 305 which, for example, is specifically configured to properly operate second surroundings sensor 305 at the lowest power consumption.
3. Switching off or deactivating second surroundings sensor 305 by activating or triggering switch 315.

If the measured result of second surroundings sensor 305 indicates that the occupied status of a parking space has changed, the status change is communicated via wireless communication interface 317, for example, a system gateway, and ultimately to the remote processor, and microcontroller 307 enters the sleep mode. If, however, the measured result indicates that the occupied status of the parking space has not changed since the last data transmission with the aid of wireless communication interface 317, microcontroller 307 immediately enters the sleep mode.

In one specific embodiment, first surroundings sensor 303 is a magnetic sensor (magnetic field sensor) and the second surroundings sensor is a radar-based sensor element, ideally, an ultra wideband (UWB) and frequency-stepped continuous wave radar receiver (FSCW). In order to implement the concept of the very low power consumption, it is provided according to one specific embodiment to reduce a number of frequencies used in the measuring method in order to limit a measuring time. In addition, it is provided according to one specific embodiment that the radar signal process is reduced to a minimum by carrying out a processing of the raw data provided by the radar unit in the time domain (time range) and not, as usual, in the frequency domain (frequency range). The signal processing is carried out in microcontroller 307 and the carrying out of a time-frequency-domain signal analysis and the processing require extensive computing resources. In general, it is not necessary to ascertain the actual distance (for example, in cm) between the radar sensor and the vehicle via the sensor, but rather only a yes/no decision whether a vehicle is even there. Thus, the complexity of the signal processing may be further reduced. According to one specific embodiment, it is provided to select the frequency band in the 2.4 GHz ISM (industrial, scientific and medical band) for a worldwide utilization.

In one specific embodiment, first surroundings sensor 303 is a magnetic sensor (magnetic field sensor) and second surroundings sensor 305 is an ultrasonic sensor. The concept of the very low power consumption in this specific embodiment benefits from the very short measuring time required by the ultrasonic sensor. Furthermore, the signal processing is also held to a minimum, since it is generally unnecessary to ascertain the actual distance (for example, in cm) of the vehicle parked over the sensor, but only to ascertain a yes/no decision about whether a vehicle is even located there.

In yet another specific embodiment, first surroundings sensor 303 is a magnetic sensor (magnetic field sensor) and second surroundings sensor 305 is an infrared sensor. Here, too, the concept of the very low power consumption in this specific embodiment benefits from the very short measuring time required by the infrared sensor, and from the low current consumption of this sensor compared to the other two described specific embodiments. Furthermore, the signal processing is also held to a minimum, since it is generally unnecessary to ascertain the actual distance (for example, in cm) of the vehicle parked over the sensor, but only to ascertain a yes/no decision whether a vehicle is even located there.

All three preceding exemplary specific embodiments have, in particular, the advantage that the power consumption may be reduced, which therefore may increase the service life of the sensor device. All three sensor combinations also offer the advantage that they are resistant to changes, whether these are temporary changes or permanent changes in the scanned magnetic field due to changes in the environment (for example, snow, rain, ice—in particular in the case of the first specific embodiment with radar), electrical components of the vehicle which cause electromagnetic disturbances, the quantity of metal contained in the vehicle, (temporary) electromagnetic disturbances caused by passing trains, electric buses or trams if the sensor is located outside.

The specific embodiment in which the radar sensor is used offers a further advantage, which cannot be achieved with the other two previously mentioned sensor combinations:
1. Neither the specific embodiment in which the infrared sensor is used, nor the specific embodiment in which the ultrasonic sensor is used, function outside or at least only to a limited degree if snow accumulates on the parking space sensor device.
2. The specific embodiment with the infrared sensor generally also does not function or at least functions only to a limited degree if dirt accumulates on the transparent surface necessary for the infrared sensor.
3. For the specific embodiment with the ultrasonic sensor, a flexible surface is generally required, which is able to propagate the pressure waves generated by the ultrasonic sensor. Thus, the parking space sensor device may not be used in regions, in which automobiles use tires in the winter having spikes (pins in the profile of the tires).

Additional advantages are in particular, the following: the combination of two sensors enables a very robust, fail-safe sensor system. In addition, a cost-effective operation and a low maintenance are possible in one single element (sensor device). Furthermore, the sensor device may be easily developed and installed.

What is claimed is:

1. A method for operating a sensor system for detecting an object, the sensor system including a first surroundings sensor and a second surroundings sensor for detecting a surroundings of the sensor device, the method comprising: detecting a surroundings of the sensor device using the first surroundings sensor to ascertain first surroundings data based on the detected surroundings, the second surroundings sensor being deactivated; ascertaining whether the first surroundings data are sufficient to be able to conclude with a predetermined probability whether an object is located in the surroundings; if the first surroundings data are sufficient, ascertaining whether an object is located in the surroundings, based on the first surroundings data; activating the deactivated second surroundings sensor only if the first surroundings data are not sufficient; detecting the surroundings of the sensor device using the second surroundings sensor to ascertain second surroundings data based on the detected surroundings; and ascertaining whether an object is located in the surroundings, based on the second surroundings data, wherein both of the first surroundings sensor and the second surroundings sensor are deactivated after the corresponding detection of the surroundings.

2. The method as recited in claim 1, wherein an instantaneous result of the ascertainment of whether an object is located in the surroundings is compared with an earlier result of a chronologically earlier ascertainment of whether an object is located in the surroundings, the instantaneous result being transmitted over a communication network only if there is a difference between the instantaneous result and the earlier result.

3. The method as recited in claim 1, wherein the activation and the deactivation of the second surroundings sensor is carried out using a switch which is connected between the second surroundings sensor and an electrical power supply.

4. The method as recited in claim 1, wherein one of: (i) the first surroundings sensor is a magnetic field sensor and the second surroundings sensor is a radar sensor, (ii) the first surroundings sensor is a magnetic field sensor and the second surroundings sensor is an ultrasonic sensor, or (iii) the first surroundings sensor is a magnetic field sensor and the second surroundings sensor is an infrared sensor.

5. The method as recited in claim 4, wherein the first surroundings sensor is a magnetic field sensor and the second surroundings sensor is a radar sensor, the ascertainment of the second surroundings data including a processing of raw radar sensor data in a time range.

6. The method as recited in claim 5, wherein the object is one of: (i) a vehicle stored in a parking position, (ii) a vehicle driving on a street, or (iii) a container stored in a container storage yard.

7. A sensor device for detecting an object, comprising: a first surroundings sensor and a second surroundings sensor for detecting a surroundings of the sensor device; a control unit for controlling the first and second surroundings sensors, the control unit being designed to control the first surroundings sensor in such a way that a surroundings of the sensor device is detected with the aid of the first surroundings sensor, the second surroundings sensor being deactivated; and a processor designed to ascertain first surroundings data based on the detected surroundings, the processor further being designed to ascertain whether the first surroundings data are sufficient, in order to be able to conclude with a predetermined probability whether an object is located in the surroundings, the processor further being designed to, if the first surroundings data are sufficient, ascertain based on the first surroundings data whether an object is located in the surroundings; wherein the control unit is designed, only if the first surroundings data are not sufficient, to activate the deactivated second surroundings sensor and to control the activated second surroundings sensor in such a way that a surroundings of the sensor device is detected with the aid of the second surroundings sensor; and wherein the processor is designed to ascertain second surroundings data based on the surroundings detected using the second surroundings sensor and to ascertain based on the second surroundings data whether an object is located in the surroundings, wherein the control unit is designed to deactivate both of the first surroundings sensor and the second surroundings sensor, after the corresponding detection of the surroundings.

8. The sensor device as recited in claim 7, wherein the processor is designed to compare an instantaneous result of the ascertainment of whether an object is located in the surroundings with an earlier result of a chronologically earlier ascertainment of whether an object is located in the surroundings, a communication interface being provided, which is designed to transmit the instantaneous result over a communication network if there is a difference between the instantaneous results and the earlier result.

9. The sensor device as recited in claim 7, further comprising:
an electrical power supply; and
a switch connected between the second surroundings sensor and the electrical power supply so that the activation and the deactivation of the second surroundings sensor may be carried out using the switch.

10. The sensor device as recited in claim 7, wherein one of: (i) the first surroundings sensor is a magnetic field sensor and the second surroundings sensor is a radar sensor, (ii) the first surroundings sensor is a magnetic field sensor and the second surroundings sensor is an ultrasonic sensor, or (iii) the first surroundings sensor is a magnetic field sensor and the second surroundings sensor is an infrared sensor.

11. The sensor device as recited in claim 7, wherein the first surroundings sensor is a magnetic field sensor and the second surroundings sensor is a radar sensor, the processor being designed to process the raw radar sensor data in a time range in order to ascertain the second surroundings data based on the processing.

12. The sensor device as recited in claim 7, wherein the object is one of: (i) a vehicle stored in a parking position, (ii) a vehicle driving on a street, or (iii) a container stored in a container storage yard.

13. A non-transitory computer readable storage medium storing a computer program including program code for operating a sensor system for detecting an object, the sensor system including a first surroundings sensor and a second surroundings sensor for detecting a surroundings of the sensor device, the program code, when executed by a computer, causing the computer to perform: detecting a surroundings of the sensor device using the first surroundings sensor to ascertain first surroundings data based on the detected surroundings, the second surroundings sensor being deactivated; ascertaining whether the first surroundings data are sufficient to be able to conclude with a predetermined probability whether an object is located in the surroundings; activating the deactivated second surroundings sensor only if the first surroundings data are not sufficient; detecting the surroundings of the sensor device using the second surroundings sensor to ascertain second surroundings data based on the detected surroundings; and ascertaining whether an object is located in the surroundings, based on the second surroundings data, wherein both of the first surroundings sensor and the second surroundings sensor are deactivated after the corresponding detection of the surroundings.

14. A method for operating a sensor system for detecting an object, the sensor system including a first surroundings sensor and a second surroundings sensor for detecting a surroundings of the sensor device, the method comprising: detecting a surroundings of the sensor device using the first surroundings sensor to ascertain first surroundings data based on the detected surroundings, the second surroundings sensor being deactivated; ascertaining whether the first surroundings data are sufficient to be able to conclude with a predetermined probability whether an object is located in the surroundings; activating the deactivated second surroundings sensor only if the first surroundings data are not sufficient; detecting the surroundings of the sensor device using the second surroundings sensor to ascertain second surroundings data based on the detected surroundings; and ascertaining whether an object is located in the surroundings, based on the second surroundings data, wherein both of the first surroundings sensor and the second surroundings sensor are deactivated after the corresponding detection of the surroundings.

* * * * *